(12) United States Patent
Nakano et al.

(10) Patent No.: US 11,160,320 B2
(45) Date of Patent: Nov. 2, 2021

(54) FABRIC, MULTILAYER STRUCTURED FABRIC, AND FIBER PRODUCT

(71) Applicant: Teijin Limited, Osaka (JP)

(72) Inventors: Kiho Nakano, Osaka (JP); Kenji Iwashita, Osaka (JP)

(73) Assignee: TEIJIN LIMITED, Osaka (JP)

(*) Notice: Subject to any disclaimer, the term of this patent is extended or adjusted under 35 U.S.C. 154(b) by 95 days.

(21) Appl. No.: 16/085,687

(22) PCT Filed: Mar. 29, 2017

(86) PCT No.: PCT/JP2017/012808
§ 371 (c)(1),
(2) Date: Sep. 17, 2018

(87) PCT Pub. No.: WO2017/175632
PCT Pub. Date: Oct. 12, 2017

(65) Prior Publication Data
US 2019/0029335 A1  Jan. 31, 2019

(30) Foreign Application Priority Data

Apr. 5, 2016 (JP) .............................. JP2016-075917

(51) Int. Cl.
*A41D 13/002* (2006.01)
*A41D 31/02* (2019.01)
(Continued)

(52) U.S. Cl.
CPC ......... *A41D 31/102* (2019.02); *A41D 13/002* (2013.01); *A62B 17/04* (2013.01);
(Continued)

(58) Field of Classification Search
None
See application file for complete search history.

(56) References Cited

U.S. PATENT DOCUMENTS

2005/0221706 A1   10/2005   Bader et al.
2007/0026752 A1    2/2007   Thiriot
(Continued)

FOREIGN PATENT DOCUMENTS

EP   3 421 651 A1   1/2019
JP   2002-339122 A   11/2002
(Continued)

OTHER PUBLICATIONS

Machine translation of JP 2009280942, Wada et al. (Year: 2009).*
(Continued)

*Primary Examiner* — Shawn Mckinnon
(74) *Attorney, Agent, or Firm* — Sughrue Mion, PLLC

(57) ABSTRACT

The invention addresses the problem of providing a cloth, a multilayered cloth, and a textile product, which have flame retardancy and heat insulation and develop a relief structure when exposed to flame or heat. As a means for resolution, a cloth characterized in that a yarn A having a high thermal shrinkage rate and a yarn B having a low thermal shrinkage rate are alternately arranged in the warp direction or weft direction is obtained, then, as necessary, a multilayered cloth is obtained using the cloth as an intermediate layer, and further, as necessary, a textile product is formed using the multilayered cloth.

1 Claim, 1 Drawing Sheet

(51) Int. Cl.
  *A62B 17/04*    (2006.01)
  *A62C 2/00*     (2006.01)
  *D03D 15/04*    (2006.01)
  *D03D 15/12*    (2006.01)
  *A41D 31/102*   (2019.01)
  *B32B 27/12*    (2006.01)
  *B32B 27/32*    (2006.01)
  *B32B 27/40*    (2006.01)
  *B32B 5/14*     (2006.01)
  *B32B 7/028*    (2019.01)
  *B32B 27/30*    (2006.01)
  *B32B 27/36*    (2006.01)
  *B32B 5/12*     (2006.01)
  *B32B 5/02*     (2006.01)
  *D03D 13/00*    (2006.01)
  *D03D 1/00*     (2006.01)
  *B32B 5/08*     (2006.01)
  *D03D 15/47*    (2021.01)
  *D03D 15/513*   (2021.01)
  *D03D 15/567*   (2021.01)
  *A41D 31/08*    (2019.01)

(52) U.S. Cl.
  CPC .............. *A62C 2/00* (2013.01); *B32B 5/024* (2013.01); *B32B 5/026* (2013.01); *B32B 5/08* (2013.01); *B32B 5/12* (2013.01); *B32B 5/142* (2013.01); *B32B 7/028* (2019.01); *B32B 27/12* (2013.01); *B32B 27/30* (2013.01); *B32B 27/304* (2013.01); *B32B 27/32* (2013.01); *B32B 27/36* (2013.01); *B32B 27/40* (2013.01); *D03D 1/0035* (2013.01); *D03D 13/00* (2013.01); *D03D 13/004* (2013.01); *D03D 15/47* (2021.01); *D03D 15/513* (2021.01); *D03D 15/567* (2021.01); *A41D 31/085* (2019.02); *B32B 2250/02* (2013.01); *B32B 2250/04* (2013.01); *B32B 2262/0269* (2013.01); *B32B 2307/304* (2013.01); *B32B 2307/3065* (2013.01); *B32B 2307/732* (2013.01); *B32B 2307/736* (2013.01); *B32B 2437/00* (2013.01); *D10B 2331/021* (2013.01)

(56) References Cited

U.S. PATENT DOCUMENTS

2008/0153374 A1    6/2008    Thiriot
2009/0137176 A1    5/2009    Okuya et al.
2018/0080153 A1    3/2018    Iwashita et al.

FOREIGN PATENT DOCUMENTS

| JP | 2007-530819 A | 11/2007 |
| JP | 2008-533321 A | 8/2008 |
| JP | 2009-280942 A | 12/2009 |
| JP | 2010-255129 A | 11/2010 |
| WO | 2007/018082 A1 | 2/2007 |
| WO | WO2007089008 | * 8/2007 |

OTHER PUBLICATIONS

Communication dated Aug. 6, 2019, from the Japanese Patent Office in counterpart application No. 2018-510553.
Communication dated Aug. 22, 2019 from the State Intellectual Property Office of the P.R.C. in application No. 201780021630.9.
Communication dated Jan. 21, 2020, from the Japanese Patent Office in application No. 2018-510553.
International Search Report for PCT/JP2017/012808 dated Jun. 27, 2017 [PCT/ISA/210].
Communication dated Mar. 19, 2019, from the European Patent Office in counterpart European Application No. 17779011.0.

* cited by examiner

[FIG. 1]
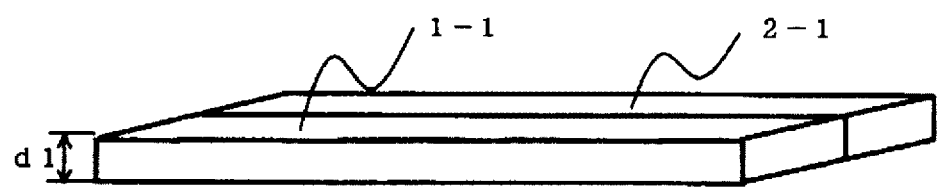
[FIG. 2]
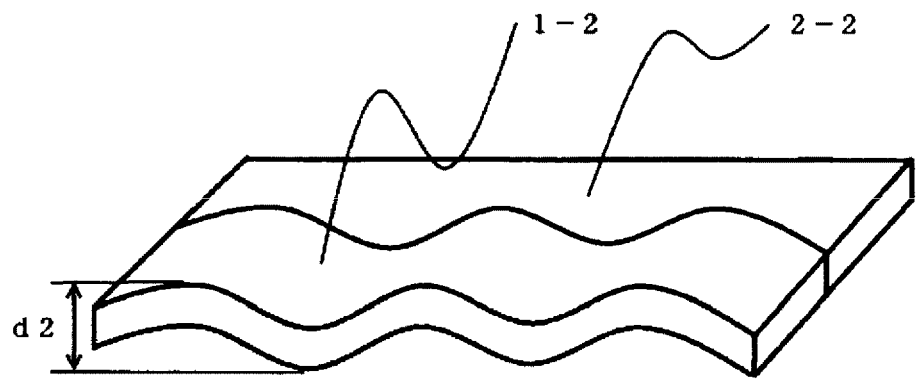

FABRIC, MULTILAYER STRUCTURED FABRIC, AND FIBER PRODUCT

CROSS REFERENCE TO RELATED APPLICATIONS

This application is a National Stage of International Application No. PCT/JP2017/012808 filed Mar. 29, 2017, claiming priority based on Japanese Patent Application No. 2016-075917 filed Apr. 5, 2016.

TECHNICAL FIELD

The present invention relates to a cloth, a multilayered cloth, and a textile product, which have flame retardancy and heat insulation and develop a relief structure when exposed to flame or heat.

BACKGROUND ART

Conventionally, various cloths have been proposed as cloths used for protective garments, such as firefighting garments. For example, PTL 1 proposes a multilayered cloth, in which the outermost layer has flame retardancy and heat insulation function, the intermediate layer has breathable waterproof function, and the innermost layer has heat insulation function. In addition, PTL 2 proposes a cloth having a double-cloth structure.

However, these cloths have not yet been satisfactory in terms of achieving both flame retardancy and heat insulation.

CITATION LIST

Patent Literature

PTL 1: JP-A-2010-255129
PTL 2: WO 2007/018082

SUMMARY OF INVENTION

Technical Problem

The invention has been accomplished against the above background. An object thereof is to provide a cloth, a multilayered cloth, and a textile product, which have flame retardancy and heat insulation and develop a relief structure when exposed to flame or heat.

Solution to Problem

The present inventors have conducted extensive research to solve the above problems. As a result, they have found that when a cloth is formed using, with ingenuity, two kinds of yarns having mutually different thermal shrinkage rates, a cloth which has flame retardancy and heat insulation and develops a relief structure when exposed to flame or heat can be obtained. As a result of further extensive research, they have accomplished the invention.

Thus, the invention provides "a cloth characterized in that a yarn A having a high thermal shrinkage rate and a yarn B having a low thermal shrinkage rate are alternately arranged in the warp direction or weft direction".

At this time, it is preferable that the cloth has an afterflame time of 2.0 seconds or less in the combustion measurement in accordance with JIS L1091-1992, A-4 Method (12-second heating method). In addition, it is preferable that the yarn A having a high thermal shrinkage rate and the yarn B having a low thermal shrinkage rate are alternately arranged at intervals of 2 to 100 mm in the warp direction or weft direction. In addition, it is preferable that the yarn A having a high thermal shrinkage rate and/or the yarn B having a low thermal shrinkage rate is a spun yarn or a filament. In addition, it is preferable that the difference in dry thermal shrinkage rate HAB between the yarn A having a high thermal shrinkage rate and the yarn B having a low thermal shrinkage rate is 10% or more.

$$\text{Dry thermal shrinkage rate (\%)} = ((\text{length before testing (mm)} - \text{length after testing(mm)})/(\text{length before testing(mm)})) \times 100$$

$$\text{Difference HAB in thermal shrinkage rate (\%)} = (\text{dry thermal shrinkage rate of the yarn A (\%)}) - (\text{dry thermal shrinkage rate of the yarn B (\%)})$$

In addition, it is preferable that the yarn A having a high thermal shrinkage rate and/or the yarn B having a low thermal shrinkage rate includes a meta-aramid fiber and/or a para-aramid fiber. In addition, it is preferable that the yarn A having a high thermal shrinkage rate includes 50 wt % or more a meta-aramid fiber, and the yarn B having a low thermal shrinkage rate includes 50 wt % or more a para-aramid fiber. In addition, it is preferable that the thickness difference D (following formula) after a dry-heat treatment at 300° C. for 5 minutes is 1.3 mm or more.

$$\text{Thickness difference D} = (\text{cloth thickness after the treatment } d2) - (\text{cloth thickness before the treatment } d1)$$

In addition, it is preferable that when subjected to a dry-heat treatment at a temperature of 300° C. for 5 minutes, the cloth develops a relief structure that is stripe-shaped and continuous in the warp direction or weft direction. In addition, it is preferable that the cloth includes a breathable waterproof film laminated on one side thereof. At this time, it is preferable that the breathable waterproof film is formed of a fluorine-based film, a polyurethane film, a polyethylene film, or a polyester film.

In addition, the invention provides a multi layered cloth including the above cloth as an intermediate layer, the intermediate layer having laminated thereon an outermost layer and an innermost layer. At this time, it is preferable that the cloth has a heat insulation (ISO17492) of 3 seconds or more as TPP TIME.

In addition, the invention provides a textile product using the above cloth or multilayered cloth and being selected from the group consisting of protective garments, firefighting fireproof garments, firefighting activity garments, rescue garments, workwear, police uniforms, and garments for the Self-Defense Forces.

Advantageous Effects of Invention

According to the invention, a cloth, a multilayered cloth, and a textile product, which have flame retardancy and heat insulation and develop a relief structure when exposed to flame or heat, are obtained.

BRIEF DESCRIPTION OF DRAWINGS

FIG. 1 schematically shows the cloth of the invention, in which a relief structure is not developed.

FIG. 2 schematically shows the cloth of the invention, in which a relief structure has been developed.

DESCRIPTION OF EMBODIMENTS

Hereinafter, embodiments of the invention will be described in detail. First, in the warp direction or weft direction of the cloth of the invention, a yarn A having a high thermal shrinkage rate (hereinafter sometimes referred to as "yarn A") and a yarn B having a low thermal shrinkage rate (hereinafter sometimes referred to as "yarn B") are alternately arranged. At this time, the arrangement of the yarn A having a high thermal shrinkage rate and the yarn B having a low thermal shrinkage rate is preferably such that a plurality of yarns and a plurality of yarns are alternated, a single yarn and a single yarn are alternated, or a plurality of yarns and a single yarn are alternated.

That is, in the warp direction or weft direction of the cloth, the yarn A having a high thermal shrinkage rate and the yarn B having a low thermal shrinkage rate are alternately switched at regular intervals. The switching interval is preferably 2 to 100 mm (more preferably 4 to 60 mm, still more preferably 6 to 50 mm). That is, it is preferable that the yarn A having a high thermal shrinkage rate and the yarn B having a low thermal shrinkage rate are alternately arranged at such intervals. In the case where the switching interval is more than 100 mm or less than 2 mm, the cloth may not develop a relief structure when exposed to flame or heat.

"Thermal shrinkage rate" in the context of the invention is the shrinkage rate of the yarn length before and after a dry-heat treatment at 450° C. or 5 minutes. It is preferable that the difference HAB in dry thermal shrinkage rate between the yarn A having a high thermal shrinkage rate and the yarn B having a low thermal shrinkage rate is 10% or more (preferably 15% or more, more preferably 17 to 40%). In the case where the difference HAB in dry thermal shrinkage rate is less than 10%, the cloth may not develop a relief structure when exposed to flame or heat.

Dry thermal shrinkage rate (%)=((length before testing (mm)−length after testing(mm))/(length before testing(mm))×100

Difference HAB in heat shrinkage (%)=(dry thermal shrinkage rate of the yarn A (%))−(dry thermal shrinkage rate of the yarn B (%))

As the yarn A having a high thermal shrinkage rate and the yarn B having a low thermal shrinkage rate, in terms of flame retardancy, it is preferable that they both include an aramid fiber (wholly aromatic polyamide fiber), and it is preferable that they are both composed only of an aramid fiber (wholly aromatic polyamide fiber). In particular, it is preferable that the yarn A having a high thermal shrinkage rate includes 50 to 98 wt % a meta-aramid fiber and 2 to 50 wt % a para-aramid fiber. In addition, it is preferable that the yarn B having a low thermal shrinkage rate includes 50 to 100 wt % a para-aramid fiber (more preferably 80 to 100 wt % a para-aramid fiber) and 0 to 50 wt % a meta-aramid fiber.

A meta-aramid fiber usually has the characteristic of having a high heatproof temperature and a high thermal shrinkage rate. Meanwhile, a para-aramid fiber usually has the characteristic of having a high heatproof temperature, a low thermal shrinkage rate, and high strength. In the case where the amount of meta-aramid fiber in the yarn A is more than 98 wt %, when the yarn A pulls the yarn B upon exposure to a high-temperature flame, it may happen that the yarn breaks due to low strength, and a relief structure is not formed. In addition, in the case where the amount is less than 50 wt %, it may happen that the shrinkage rate is so low that a relief structure is not formed. In the case where the amount of para-aramid fiber in the yarn B is less than 50 wt %, when the yarn B is pulled by the yarn A upon exposure to a high-temperature flame, it may happen that the yarn breaks due to insufficient strength, and a relief structure is not formed.

Here, a meta-aramid fiber is a fiber made of a polymer wherein 85 mol % or more of the repeating units are m-phenyleneisophthalamide. Such a meta-aramid (wholly aromatic polyamide) may also be a copolymer containing a third component in an amount within a range of less than 15 mol %.

Such a meta-aramid (wholly aromatic polyamide) can be produced by a conventionally known interfacial polymerization method. With respect to the polymerization degree of the polymer, it is preferable to use one having an intrinsic viscosity (I.V.) within a range of 1.3 to 1.9 dl/g as measured with a 0.5 g/100 ml N-methyl-2-pyrrolidone solution.

The meta-aramid (wholly aromatic polyamide) may contain an alkylbenzenesulfonic acid onium salt. Preferred examples of alkylbenzenesulfonic acid onium salts include compounds such as a hexylbenzenesulfonic acid tetrabutylphosphonium salt, a hexylbenzenesulfonic acid tributylbenzylphosphonium salt, a dodecylbenzenesulfonic acid tetraphenylphosphonium salt, a dodecylbenzenesulfonic acid tributyltetradecylphosphonium salt, a dodecylbenzenesulfonic acid tetrabutylphosphonium salt, and a dodecylbenzenesulfonic acid tributylbenzylammonium salt. Among them, a dodecylbenzenesulfonic acid tetrabutylphosphonium salt and a dodecylbenzenesulfonic acid tributylbenzylammonium salt are particularly preferable as they are easy to obtain, have excellent thermal stability, and also have high solubility in N-methyl-2-pyrrolidone.

In order to obtain a sufficient improving effect on dye affinity, it is preferable that the content of the alkylbenzenesulfonic acid onium salt is within a range of 2.5 mol % or more (preferably 3.0 to 7.0 mol %) relative to poly-m-phenylene isophthalamide.

In addition, as a method for mixing poly-m-phenylene isophthalamide and an alkylbenzenesulfonic acid onium salt, a method in which poly-m-phenylene isophthalamide is mixed and dissolved in a solvent, and then an alkylbenzenesulfonic acid onium salt is dissolved in the solvent, is used, for example. Any of such methods may be used. The dope thus obtained is formed into fibers by a conventionally known method.

With respect to the polymer used for a meta-aramid fiber, for the purpose of improving the dyeing affinity, discoloration/fading resistance, and the like, it is also possible that into an aromatic polyamide backbone having a repeating structural unit represented by the following formula (1), an aromatic diamine component or aromatic dicarboxylic acid halide component that is different from a main structural unit of the repeating structure is copolymerized as a third component in a proportion of 1 to 10 mol % based on the total amount of the repeating structural units of the aromatic polyamide.

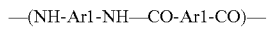

—(NH-Ar1-NH—CO-Ar1-CO)—          formula (1)

Here, Ar1 is a divalent aromatic group having a linking group in a position other than the meta position or an axially parallel direction.

In addition, copolymerization as a third component is also possible. Specific examples of aromatic diamines represented by formulae (2) and (3) include p-phenylenediamine, chlorophenylenediamine, methylphenylenediamine, acetylphenylenediamine, aminoanisidine, benzidine, bis(aminophenyl)ether, bis(aminophenyl)sulfone, diaminobenzanilide, and diaminoazobenzene. Specific examples of aromatic dicarboxylic acid dichlorides represented by formulae (4) and (5) include terephthalic acid chloride, 1,4-naphthalenedicarboxylic acid chloride, 2,6-naphthalenedicarboxylic acid chloride, 4,4'-biphenyldicarboxylic acid chloride, 5-chloroisophthalic acid chloride, 5-methoxyisophthalic acid chloride, and bis(chlorocarbonylphenyl)ether.

H₂N-Ar2-NH₂                         formula (2)

H₂N-Ar2-Y-Ar2-NH₂                   formula (3)

XOC-Ar3-COX                         formula (4)

XOC-Ar3-Y-Ar3-COX                   formula (5)

Here, Ar2 is a divalent aromatic group different from Ar1, Ar3 is a divalent aromatic group different from Ar1, Y is at least one atom or functional group selected from the group consisting of an oxygen atom, a sulfur atom, and an alkylene group, and X is a halogen atom.

In addition, it is preferable that the crystallinity of the meta-aramid fiber is 5 to 35% for the reason that the dye exhaustion properties are excellent, and even when the amount of dye is reduced or the dyeing conditions are mild, the color can be easily adjusted as intended. Further, for the reason that uneven dye distribution on the surface is unlikely to occur, the discoloration/fading resistance is also high, and also the practically necessary dimensional stability can be ensured, the crystallinity is more preferably 15 to 25%.

In addition, it is preferable that the residual solvent content of the meta-aramid fiber is 0.1 wt % or less for the reason that the excellent flame retardancy of the meta-aramid fiber is not impaired, uneven dye distribution on the surface is unlikely to occur, and the discoloration/fading resistance is also high.

The meta-aramid fiber can be produced by the following method. In particular, by the method described below, the crystallinity and residual solvent content can be made within the above ranges.

The polymerization method for a meta-aramid (wholly aromatic polyamide) polymer is not particularly limited, and it is possible to use, for example, the solution polymerization method or interfacial polymerization method described in JP-B-35-14399, U.S. Pat. No. 3,360,595, JP-B-47-10863, and the like.

The spinning solution does not have to be particularly limited, and it is possible to use an amide solvent solution containing an aromatic copolyamide polymer obtained by the solution polymerization or interfacial polymerization described above, for example. It is also possible that the polymer is isolated from the polymerization solution, dissolved in an amide solvent, and used.

Examples of amide solvents used herein include N,N-dimethylformamide, N,N-dimethylacetamide, N-methyl-2-pyrrolidone, and dimethyl sulfoxide. N,N-dimethylacetamide is particularly preferable.

When the aromatic polyamide copolymer solution obtained as above further contains an alkali metal salt or alkaline earth metal salt, the solution is further stabilized and becomes usable at higher concentrations and lower temperatures; therefore, this is preferable. It is preferable that the alkali metal salt or alkaline earth metal salt is 1 wt % or less (more preferably 0.1 wt % or less) based on the total weight of the polymer solution.

In a spinning/coagulation step, the spinning solution obtained above (meta-aramid polymer solution) is extruded into a coagulation liquid and coagulated.

The spinning apparatus is not particularly limited, and a conventionally known wet-spinning apparatus can be used. In addition, as long as wet spinning can be stably performed, there is no need to particularly limit the number of spinning holes of the spinneret, their arrangement, the hole shape, and the like. For example, it is possible to use a multi-hole spinneret for staple fibers (short fibers), in which the number of holes is 1,000 to 30,000 and the spinning hole diameter is 0.05 to 0.2 mm, or the like.

In addition, as the temperature of the spinning solution (meta-aramid polymer solution) upon extrusion from the spinneret, a temperature within a range of 20 to 90° C. is suitable.

As a coagulation bath used to obtain fibers, an aqueous solution containing substantially no inorganic salt and having an amide solvent, preferably NMP, concentration of 45 to 60 mass % is used at a bath liquid temperature within a range of to 50° C. When the amide solvent (preferably NMP) concentration is less than 45 wt %, this may result in a thick-skin structure, whereby the washing efficiency in a washing step decreases, making it difficult to reduce the residual solvent content of the fiber. Meanwhile, in the case where the amide solvent (preferably NMP) concentration is more than 60 wt %, uniform coagulation inside fibers may not be achieved, making it difficult, also in this case, to reduce the residual solvent content of the fiber. Incidentally, as the time of fiber immersion in the coagulation bath, a time within a range of 0.1 to 30 seconds is suitable.

Subsequently, the fiber is drawn to a draw ratio of 3 to 4 in a plastic drawing bath containing an aqueous solution having an amide solvent, preferably NMP, concentration of 45 to 60 mass % at a bath liquid temperature within a range of 10 to 50° C. After drawing, the fiber is thoroughly washed with an aqueous solution at 10 to 30° C. having an NMP concentration of 20 to 40 mass % and then through a hot water bath at 50 to 70° C.

The fiber after washing is subjected to a dry-heat treatment at a temperature of 270 to 290° C. As a result, a meta-aramid fiber that satisfies the above crystallinity and residual solvent content ranges can be obtained.

In the meta-aramid fiber, the fiber may be in the form of long fibers (multifilament) or short fibers. In particular, in terms of blend-spinning with other fibers, short fibers having a fiber length of 25 to 200 mm are preferable. In addition, it is preferable that the single-fiber fineness is within a range of 1 to 5 dtex.

Examples of commercially available products of meta-aramid fibers include, Conex®, Conex® Neo, and Nomex®.

In addition, a para-aramid fiber is a fiber made of a polyamide having an aromatic ring on the main chain, which may be poly-p-phenylene terephthalamide (PPTA) or may also be a copolymer, that is, copolyparaphenylene-3,4'-oxydiphenylene terephthalamide (PPODPA). Examples of commercially available products of para-aramid fibers include Technora®, Kevlar®, and Twaron®.

In addition, examples of fibers that can be mixed and used with a para-aramid fiber and a meta-aramid fiber include polybenzimidazole fibers, polyimide fibers, polyamideimide fibers, polyetherimide fibers, polyarylate fibers, polyparaphenylene benzobisoxazole fibers, Novoloid fibers, flame-retardant acrylic fibers, polychlarl fibers, flame-retardant polyester fibers, flame-retardant cotton fibers, flame-retardant rayon fibers, flame-retardant vinylon fibers, and flame-retardant wool fibers.

The yarn A having a high thermal shrinkage rate and the yarn B having a low thermal shrinkage rate may each be a spun yarn (short fiber) or a filament (long fiber). At this time, as the spinning technique, it is preferable to use air-jet spinning or ring spinning.

In the cloth of the invention, it is preferable that the weight per unit is 300 g/m² or less (more preferably 50 to 300 g/m²). When the weight per unit is more than 300 g/m², a relief structure may not be developed due to the self-weight.

In the cloth of the invention, the cloth structure is not limited, and may be a woven fabric or may also be a knitted fabric such as a warp-knitted fabric or a circular knitted fabric (weft-knitted fabric). Among them, a woven fabric is preferable. Among woven fabrics, those having a plain weave structure are preferable. A cloth with a twill weave structure has an increased weight per unit, and the development of a relief structure may be inhibited due to the self-weight. The warp-direction yarn and the weft-direction yarn may each be a single-ply yarn or a two-ply yarn. In particular, when one of the warp-direction yarn and the weft-direction yarn is a two-ply yarn, while the other is as a single-ply yarn, the strength can be maintained while reducing the weight per unit; therefore, this is preferable.

In addition, in the case where the cloth of the invention is a woven fabric, when the yarn A having a high thermal shrinkage rate and the yarn B having a low thermal shrinkage rate are alternately arranged at regular intervals only in one of the warp and weft (preferably only in the weft) constituting the woven fabric, a larger relief structure is developed than in the case where the yarn A having a high thermal shrinkage rate and the yarn B having a low thermal shrinkage rate are arranged in both the warp and weft; therefore, this is preferable.

The method for producing a cloth is not particularly limited, and the cloth can be knitted or woven in the usual manner using two or more kinds (preferably two to four kinds, particularly preferably two kinds) of yarns having mutually different thermal shrinkage rates. At this time, as preferred weaving machines, a shuttle weaving machine, a rapier weaving machine, an air-jet weaving machine, and the like can be mentioned. As knitting machines, a tricot knitting machine, a circular knitting machine, and the like can be mentioned.

In the cloth thus obtained, it is preferable that the cloth has an afterflame time of 2.0 seconds or less in the combustion measurement in accordance with JIS L1091-1992, A-4 Method (12-second heating method).

In the cloth of the invention, the yarn A having a high thermal shrinkage rate and the yarn B having a low thermal shrinkage rate are alternately arranged (switched at regular intervals) in the warp direction or weft direction. As a result, upon exposure to flame or heat, a relief structure is developed, whereby the heat insulation improves. At this time, when the yarn A having a high thermal shrinkage rate and the yarn B having a low thermal shrinkage rate both include an aramid fiber, the flame retardancy also improves; therefore, this is preferable. In particular, when the yarn A having a high thermal shrinkage rate and the yarn B having a low thermal shrinkage rate are both composed only of an aramid fiber, excellent flame retardancy is obtained; therefore, this is preferable.

At this time, it is preferable that when subjected to a dry-heat treatment at 300° C. for 5 minutes, the cloth develops a relief structure that is stripe-shaped and continuous in the warp direction or weft direction. At this time, it is preferable that the thickness difference D represented by the following formula is 1.3 mm or more (preferably 1.5 to 5.0 mm, more preferably 2.0 to 5.0 mm). Incidentally, thickness in the context of the invention refers to the sum of the cloth thickness and an air layer expanded after the dry-heat treatment. In the measurement of thickness, a pressure of 7 g/cm is applied using a circular load having a diameter of 35 mm.

Cloth thickness difference $D=$(thickness after the dry-heat treatment $d2$)−(thickness before the dry-heat treatment $d1$).

In addition, it is preferable that the thickness difference D (following formula) before/after the exposure of the cloth to flame and heat of 80 kw/m² in accordance with ISO17492 is 0.1 mm or more (more preferably 1.3 mm to 5.0 mm, particularly preferably 2.0 to 5.0 mm). Incidentally, thickness in the context of the invention refers to the sum of the cloth thickness and an air layer expanded after exposure. In the measurement of thickness, a pressure of 7 g/cm² is applied using a circular load having a diameter of 35 mm.

Cloth thickness difference $D=$(thickness after exposure to flame and heat)−(thickness before exposure to flame and heat)

In the cloth of the invention, when a breathable waterproof film is laminated on one side of the cloth, a breathable waterproof effect is added to the cloth, and also a larger relief structure is developed upon exposure to flame or heat; therefore, this is preferable. At this time, it is preferable that the breathable-waterproof film is formed of a fluorine-based film, a polyurethane film, a polyethylene film, or a polyester film. As the method for attachment to the cloth, lamination to one side of the cloth is preferable.

Next, the multilayered cloth of the invention is a multi layered cloth including the above cloth as an intermediate layer, with an outermost layer laminated on one surface of the intermediate layer and an innermost layer laminated on the other surface of the intermediate layer.

Here, it is preferable that the outermost layer is formed of a cloth made from a meta-aramid fiber and a para-aramid fiber. As the kind of cloth, a woven or knitted fabric or a nonwoven fabric may be used. However, practically, a woven fabric is preferable in terms of strength. In addition, the meta-aramid fiber and the para-aramid fiber may be used in the form of filaments, combined filament yarns, spun yarns, and the like. However, it is preferable that the fibers are blend-spun and used in the form of a spun yarn. It is preferable that the mixing ratio of the para-aramid fiber is 1 to 70 wt % based on the total weight of fibers constituting the outermost layer. When the mixing ratio of the para-aramid fiber is less than 1 wt %, upon exposure to flame, the cloth may break, that is, a hole may be formed. In addition, when the ratio is more than 70 wt %, the para-aramid fiber may be fibrillated, whereby the wear resistance decreases.

In addition, it is preferable that the heat insulating layer is a cloth made from spun yarns including 99 to 50 wt % meta-aramid fibers and 1 to 50 wt % para-aramid fibers, or alternatively spun yarns or filaments composed only of meta-aramid fibers or para-aramid fibers. As the cloth, a woven fabric, a knitted fabric, or a nonwoven fabric is usable. In addition, as the cloth structure, in order to reduce the area of direct contact between the cloth and the skin for the purpose of preventing the sticky feeling when worn, a structure that develops asperities at the time of weaving or dyeing processing is preferable.

In addition, in the multilayered cloth, it is preferable that a breathable waterproof film is laminated on one side of the cloth serving as an intermediate layer. At this time, it is preferable that the breathable waterproof film is formed of a fluorine-based film, a polyurethane film, a polyethylene film, or a polyester film. As the method for attachment to the cloth, lamination to one side of the cloth is preferable.

The multilayered cloth includes the above cloth as an intermediate layer. As a result, upon exposure to flame and heat, the cloth (intermediate layer) in the exposed region develops a relief structure, whereby the heat insulation improves. At this time, when the yarn A having a high thermal shrinkage rate and the yarn B having a low thermal shrinkage rate both include an aramid fiber, the flame retardancy also improves.

At this time, it is preferable that upon exposure to flame and heat of 80 kw/m$^2$ in accordance with ISO17492, the cloth (intermediate layer) in the exposed region develops a relief structure, and the relief structure is stripe-shaped and continuous in the warp direction or weft direction (preferably in only one of the warp direction and weft direction).

In addition, in the multilayered cloth, it is preferable that the cloth has a heat insulation (ISO17492) of 3 seconds or more as TPP TIME.

Next, the textile product of the invention is a textile product using the above cloth or multilayered cloth and being selected from the group consisting of protective garments, firefighting fireproof garments, firefighting activity garments, rescue garments, workwear, police uniforms, and garments for the Self-Defense Forces. Because the textile product uses the above cloth or multilayered cloth, a relief structure is developed upon exposure to flame or heat, leading to flame retardancy and heat insulation.

EXAMPLES

Next, examples of the invention and comparative examples will be described in detail, but the invention is not limited thereto.

(1) Dry Thermal Shrinkage Rate 10 mm of a yarn extracted from the cloth was placed in an electric furnace at 450° C. for 5 minutes, and the dry thermal shrinkage rate was calculated by the following equation.

Dry thermal shrinkage rate (%)=((length before testing (mm)−length after testing(mm))/(length before testing(mm))×100

(2) Measurement of Expansion

A sample cut to a size of 15 cm×15 cm was placed in an electric furnace at a temperature of 300° C. for 5 minutes, and then the degree of expansion of the developed relief structure (cloth thickness difference D) was measured. In the measurement of thickness, a pressure of 7 g/cm$^2$ was applied using a circular load having a diameter of 35 mm.

Cloth thickness difference D=(thickness after the dry-heat treatment $d2$)−(thickness before the dry-heat treatment $d1$)

(3) Afterflame Time

The afterflame time was measured by the combustion measurement in accordance with JIS L1091-1992, A-4 Method (12-second heating method).

(4) Heat Insulation

An outermost layer, an intermediate layer, and a heat insulating layer were laminated, and the outermost layer side was exposed at 80 kw/m$^2$ (in accordance with ISO 17492). At this time, a sensor was placed on the cloth. The TPP TIME (second) after exposure was measured.

At this time, the outermost layer used was a woven fabric formed to have a 2/1 twill weave structure (weight per unit: 240 g/m$^2$) using a spun yarn (yarn count: 40/2) composed of a heat-resistant fiber obtained by mixing a polymetaphenylene isophthalamide fiber (manufactured by Teijin Limited, trade name: Conex) and a coparaphenylene/3,4'-oxydiphenylene terephthalamide fiber (manufactured by Teijin Limited, trade name: Technora) in a weight ratio of 90:10. The heat insulating layer used was a fabric woven to have a waffle structure having a weight per unit of 150 g using a spun yarn (yarn count: 40/2) composed of a heat-resistant fiber obtained by mixing a polymetaphenylene isophthalamide fiber (manufactured by Teijin Limited, trade name: Conex) and a coparaphenylene/3,4'-oxydiphenylene terephthalamide fiber (manufactured by Teijin Limited, trade name: Technora) in a weight ratio of 95:5.

Example 1

A spun yarn (No. 40 count/two-ply yarn) composed of a meta-aramid fiber (MA) and a para-aramid fiber (PA) each in the form of staple fibers (each fiber length: 51 mm) blend-spun in a weight ratio of MA/PA=95/5 was used as a warp-direction yarn and a weft-direction yarn A, while a spun yarn (No. 40 count/two-ply yarn) composed only of PA was used as a weft-direction yarn B. With a rapier weaving machine, a woven fabric (plain weave structure) having a weight per unit of 70 g/m$^2$ was formed changing the weft-direction yarn A and the weft-direction yarn B at intervals of 20 mm. Subsequently, scouring was performed in the usual manner, the meta-aramid fiber was dyed, and then the fabric was heat-set to give a cloth.

The dry thermal shrinkage rates of the MA/PA spun yarn (yarn A having a high thermal shrinkage rate) and the PA spun yarn (yarn B having a low thermal shrinkage rate) were 30% and 0%, respectively, and HAB was 30%.

The obtained cloth was subjected to a dry-heat treatment at 300° C. for 5 minutes. As a result, a relief structure was developed in the weft direction, and the thickness difference was 2.0 mm. In addition, the afterflame time was 1.0 second.

Next, a laminate structure was formed using the cloth as an intermediate layer. As a result, the heat insulation was 3.4 seconds, indicating excellent heat protection. Next, a fireproof garment was obtained from the laminate structure. As a result, the garment had excellent flame retardancy and heat insulation.

Example 2

A spun yarn (No. 40 count/two-ply yarn) composed of a meta-aramid fiber (MA) and a para-aramid fiber (PA) each in the form of staple fibers (each fiber length: 51 mm) blend-spun in a weight ratio of MA/PA=95/5 was used as a warp yarn and a weft yarn A, while a spun yarn (No. 40 count/two-ply yarn) composed only of PA was used as a weft yarn B. With a rapier weaving machine, a woven fabric (plain weave structure) of 70 g/m$^2$ was formed changing the weft yarn A and the weft yarn B at intervals of 10 mm. Subsequently, scouring was performed in the usual manner, the meta-aramid fiber was dyed, and then the fabric was heat-set to give a cloth.

The dry thermal shrinkage rates of the MA/PA spun yarn and the PA spun yarn were 30% and 0%, respectively, and HAB was 30%.

The obtained cloth was subjected to a dry-heat treatment at 300° C. for 5 minutes. As a result, a relief structure was developed in the weft direction, and the thickness difference was 2.0 mm. In addition, the afterflame time was 1.0 second.

Next, a laminate structure was formed using the cloth as an intermediate layer. As a result, the heat insulation was 3.5 seconds, indicating excellent heat protection.

Example 3

A spun yarn (No. 40 count/two-ply yarn) composed of a meta-aramid fiber (MA) and a para-aramid fiber (PA) each in the form of staple fibers (each fiber length: 51 mm) blend-spun in a weight ratio of MA/PA=95/5 was used as a warp-direction yarn and a weft-direction yarn A, while a spun yarn (No. 40 count/two-ply yarn) composed only of PA was used as a weft-direction yarn B. With a rapier weaving machine, a woven fabric (plain weave structure) having a weight per unit of 70 g/m² was formed changing the weft-direction yarn A and the weft-direction yarn B at intervals of 20 mm. Subsequently, scouring was performed in the usual manner, the meta-aramid fiber was dyed, and then the fabric was heat-set to give a cloth.

The dry thermal shrinkage rates of the MA/PA spun yarn (yarn A having a high thermal shrinkage rate) and the PA spun yarn (yarn B having a low thermal shrinkage rate) were 30% and 0%, respectively, and HAB was 30%.

On one side of the obtained cloth, a breathable waterproof film made of polytetrafluoroethylene (manufactured by Japan Gore-Tex, weight per unit: 35 g/m²) was laminated.

The obtained cloth was subjected to a dry-heat treatment at a temperature of 300° C. for 5 minutes. As a result, a relief structure was developed in the weft direction, and the thickness difference was 2.4 mm. In addition, the afterflame time was 1.0 second.

Next, a laminate structure was formed using the cloth as an intermediate layer. As a result, the heat insulation was 3.4 seconds, indicating excellent heat protection. Next, a fireproof garment was obtained from the laminate structure. As a result, the garment had excellent flame retardancy and heat insulation.

Example 4

A spun yarn (No. 40 count/two-ply yarn) composed of a meta-aramid fiber (MA) and a para-aramid fiber (PA) each in the form of staple fibers (each fiber length: 51 mm) blend-spun in a weight ratio of MA/PA=95/5 was used as a warp yarn and a weft yarn A, while a spun yarn (No. 40 count/two-ply yarn) composed only of PA was used as a weft yarn B. With a rapier weaving machine, a woven fabric (plain weave structure) of 70 g/m² was formed changing the weft yarn A and the weft yarn B at intervals of 10 mm. Subsequently, scouring was performed in the usual manner, the meta-aramid fiber was dyed, and then the fabric was heat-set to give a cloth.

The dry thermal shrinkage rates of the MA/PA spun yarn and the PA spun yarn were 30% and 0%, respectively, and HAB was 30%.

On one side of the obtained cloth, a breathable waterproof film made of polytetrafluoroethylene (manufactured by Japan Gore-Tex, weight per unit: 35 g/m²) was laminated.

The obtained cloth was subjected to a dry-heat treatment at a temperature of 300° C. for 5 minutes. As a result, a relief structure was developed in the weft direction, and the thickness difference was 2.5 mm. In addition, the afterflame time was 1.0 second.

Next, a laminate structure was formed using the cloth as an intermediate layer. As a result, the heat insulation was 3.5 seconds, indicating excellent heat protection.

Example 5

A cloth was obtained in the same manner as in Example 1 except that a spun yarn (No. 40 count/two-ply yarn) composed of a meta-aramid fiber (MA) and a para-aramid fiber (PA) each in the form of staple fibers (each fiber length: 51 mm) blend-spun in a weight ratio of MA/PA=95/5 was used as a warp yarn A and a weft yarn A, while a spun yarn (No. 40 count/two-ply yarn) composed only of PA was used as a warp yarn B and a weft yarn B, and a woven fabric (plain weave structure) having a weight per unit of 70 g/m² was formed changing the weft yarn A and the weft yarn B at intervals of 20 mm and also changing the warp yarn A and the warp yarn B at intervals of 20 mm.

The cloth was subjected to a dry-heat treatment at a temperature of 300° C. for 5 minutes. As a result, a relief structure was developed in the warp and weft directions, and the thickness difference was smaller than in the cloth obtained in Example 1. In addition, the afterflame time was 1.0 second. Next, a laminate structure was formed using the cloth as an intermediate layer. As a result, the heat insulation was 3.3 seconds, indicating excellent heat protection.

Comparative Example 1

Using spun yarns (No. 40 count/two-ply yarn) blend-spun in a weight ratio of MA/PA=95/5 as a warp yarn and a weft yarn, a woven fabric (plain weave structure) having a weight per unit of 70 g/m² was formed. Subsequently, scouring was performed in the usual manner, the meta-aramid fiber was dyed, and then the fabric was heat-set to give a cloth.

The dry thermal shrinkage of the MA/PA spun yarn was 30%. In addition, the cloth was subjected to a dry-heat treatment at a temperature of 300° C. for 5 minutes. As a result, a relief structure was not developed.

A laminate structure was formed using the obtained cloth as an intermediate layer. As a result, the heat insulation was 2.0 seconds, indicating insufficient heat protection.

Comparative Example 2

Using a spun yarn (No. 40 count/two-ply yarn) blend-spun in a weight ratio of MA/PA=95/5 as a warp yarn and a weft yarn, a woven fabric (plain weave structure) having a weight per unit of 70 g/m² was formed. Subsequently, scouring was performed in the usual manner, the meta-aramid fiber was dyed, and then the fabric was heat-set to give a cloth. The dry thermal shrinkage rate of the MA/PA spun yarn was 30%.

On one side of the obtained cloth, a breathable waterproof film made of polytetrafluoroethylene (manufactured by Japan Gore-Tex, weight per unit: 35 g/m²) was laminated. The cloth was subjected to a dry-heat treatment at a temperature of 300° C. for 5 minutes. As a result, a relief structure was not developed.

A laminate structure was formed using the obtained cloth as an intermediate layer. As a result, the heat insulation was 2.0 seconds, indicating insufficient heat protection.

INDUSTRIAL APPLICABILITY

According to the invention, a cloth, a multilayered cloth, and a textile product, which have flame retardancy and heat insulation and develop a relief structure when exposed to flame or heat, are provided. Thus, the industrial value of the invention is extremely high.

REFERENCE SIGNS LIST

1-1, 1-2: Part where a yarn B having a low thermal shrinkage rate is arranged

2-1, 2-2: Part where a yarn A having a high thermal shrinkage rate is arranged

The invention claimed is:

1. A textile product comprising a multilayered cloth and being selected from the group consisting of protective garments, firefighting fireproof garments, firefighting activity garments, rescue garments, workwear, police uniforms, and garments for Self-Defense Forces, wherein the multilayered cloth has a heat insulation (ISO17492) of 3 seconds or more as TPP TIME, and the multilayered cloth comprises a cloth as an intermediate layer, the intermediate layer having laminated thereon an outermost layer and an innermost layer, and the cloth is characterized in that a yarn A having a high thermal shrinkage rate and a yarn B having a low thermal shrinkage rate are alternately arranged at intervals of 10 to 50 mm in only one of the warp direction and weft direction of the cloth, and the thickness difference D (following formula) after a dry-heat treatment at 300° C. for 5 minutes is 2.0 mm or more wherein a sample cut to a size of 15 cm×15 cm is placed in an electric furnace at a temperature of 300° C. for 5 minutes, and then the degree of expansion of the developed relief structure (cloth thickness difference D) is measured and in the measurement of thickness, a pressure of 7 g/cm² is applied using a circular load having a diameter of 35 mm, $$\text{Thickness difference } D = (\text{cloth thickness after the treatment } d2) - (\text{cloth thickness before the treatment } d1),$$

and when subjected to a dry-heat treatment at a temperature of 300° C. for 5 minutes, the cloth develops a relief structure that is stripe-shaped and continuous in the warp direction or weft direction, and the cloth has an afterflame time of 2.0 seconds or less in the combustion measurement in accordance with JIS L1091-1992, A-4 Method (12-second heating method), and the yarn A having a high thermal shrinkage rate and/or the yarn B having a low thermal shrinkage rate is a spun yarn or a filament, and the difference HAB in dry thermal shrinkage rate between the yarn A having a high thermal shrinkage rate and the yarn B having a low thermal shrinkage rate is 10% or more:

$$\text{Dry thermal shrinkage rate (\%)} = ((\text{length before testing(mm)} - \text{length after testing (mm)})/(\text{length before testing(mm)})) \times 100,$$

$$\text{Difference HAB in thermal shrinkage rate (\%)} = (\text{dry thermal shrinkage rate of the yarn A (\%)}) - (\text{dry thermal shrinkage rate of the yarn B (\%)}),$$

and the yarn A having a high thermal shrinkage rate includes 50 wt % or more of a meta-aramid fiber, and the yarn B having a low thermal shrinkage rate includes 50 wt % or more of a para-aramid fiber, and the cloth includes a breathable waterproof film laminated on one side thereof, and the breathable waterproof film is formed of a fluorine-based film, a polyurethane film, a polyethylene film, or a polyester film, and the residual solvent content of the meta-aramid fiber is 0.1 wt % or less, and the yarn A having a high thermal shrinkage rate includes 50 to 95 wt % of a meta-aramid fiber and 5 to 50 wt % of a para-aramid fiber.

* * * * *